United States Patent
Moraes

(10) Patent No.: US 8,627,669 B2
(45) Date of Patent: Jan. 14, 2014

(54) ELIMINATION OF PLATE FINS IN COMBUSTION BASKETS BY CMC INSULATION INSTALLED BY SHRINK FIT

(75) Inventor: Ricardo F. Moraes, Orlando, FL (US)

(73) Assignee: Siemens Energy, Inc., Orlando, FL (US)

( * ) Notice: Subject to any disclaimer, the term of this patent is extended or adjusted under 35 U.S.C. 154(b) by 1548 days.

(21) Appl. No.: 12/175,653

(22) Filed: Jul. 18, 2008

(65) Prior Publication Data

US 2010/0011776 A1 Jan. 21, 2010

(51) Int. Cl.
 *F02C 7/20* (2006.01)
 *F02C 1/00* (2006.01)
(52) U.S. Cl.
 USPC .............................. 60/800; 60/738
(58) Field of Classification Search
 USPC ............................ 60/752–760, 731–748, 800
 See application file for complete search history.

(56) References Cited

U.S. PATENT DOCUMENTS

| | | | |
|---|---|---|---|
| 2,778,192 A | 1/1957 | Kroon | |
| 3,699,641 A | 10/1972 | Kuhnen | |
| 3,899,882 A | 8/1975 | Parker | |
| 4,399,783 A | 8/1983 | Hauser, Jr. | |
| 4,441,324 A * | 4/1984 | Abe et al. | 60/753 |
| 4,639,194 A * | 1/1987 | Bell et al. | 416/241 B |
| 4,912,931 A * | 4/1990 | Joshi et al. | 60/732 |
| 4,934,138 A * | 6/1990 | Boyd | 60/806 |
| 5,087,023 A * | 2/1992 | Gilbert et al. | 270/39.02 |
| 5,331,816 A * | 7/1994 | Able et al. | 60/753 |
| 5,636,508 A | 6/1997 | Shaffer et al. | |
| 6,098,397 A | 8/2000 | Glezer et al. | |
| 6,276,339 B1 | 8/2001 | Shebert, Jr. et al. | |
| 6,672,786 B2 | 1/2004 | Schenk | |
| 6,746,755 B2 * | 6/2004 | Morrison et al. | 428/166 |
| 7,197,877 B2 | 4/2007 | Moraes | |
| 7,237,389 B2 | 7/2007 | Ryan et al. | |
| 2002/0066273 A1 | 6/2002 | Kitamura et al. | |
| 2005/0058537 A1 * | 3/2005 | Corman et al. | 415/139 |
| 2005/0062237 A1 * | 3/2005 | Parker et al. | 277/654 |
| 2007/0012043 A1 | 1/2007 | Parker et al. | |

* cited by examiner

*Primary Examiner* — Gerald L Sung

(57) ABSTRACT

A combustor basket (20) is provided comprising a generally tubular wall (22) defining a cavity (24) and a liner (26) of a ceramic matrix composite material disposed within the cavity (24), wherein an interference fit exists between an outer surface (34) of the liner (26) located in the cavity (24) and an inner surface (28) of the generally tubular wall (22). Advantageously, the novel combustor basket (20) greatly reduces the amount of air or other medium needed to cool the combustor basket body and increases the maximum allowable flame temperature that the combustor basket (20) can withstand. A method of manufacturing the combustor basket (20) is also provided.

15 Claims, 5 Drawing Sheets

ELIMINATION OF PLATE FINS IN COMBUSTION BASKETS BY CMC INSULATION INSTALLED BY SHRINK FIT

FIELD OF THE INVENTION

The present invention relates to a combustor basket, and more particularly to a combustor basket having a liner of a ceramic matrix composite (CMC) material positioned within the combustor basket body.

BACKGROUND OF THE INVENTION

Combustion turbines are well known in the art as having a compressor section for supplying a flow of compressed combustion air, a combustor section for burning a fuel in the compressed air, and a turbine section for extracting thermal energy from the combustion air and converting that energy into mechanical energy in the form of a shaft rotation. Many parts of the combustor section and turbine section are exposed directly to the hot combustion gases, for example the combustor, the transition duct between the combustor and the turbine section, the turbine stationary vanes, rotating blades and surrounding ring segments.

It is also known that the power and efficiency of a combustion turbine may be improved by increasing the firing temperature of the fuel or fuel mixture traveling through the combustor basket of the combustor section. As a result, modern, high efficiency combustion turbines may have firing temperatures of 1600° C. or more, which is well in excess of the safe operating temperature of the structural materials used to fabricate the components of the combustor section. Accordingly, several methods have been developed to provide cooling for such components.

One known method of cooling the body of the combustor basket is to force a cooling medium, preferably air, through an annular gap having a plurality of plate fins between an inner and outer wall of the combustor basket. As shown in prior Art FIG. 1, for example, known combustor basket 10 includes an exterior wall 12 and an interior wall 14 and an annular gap 16 therebetween. Within the annular gap 16, there is located a plurality of plate or cooling fins 18 having a plurality of heat transfer plates 20 disposed along the direction of the flowing air within the annular gap 16 to transfer heat from the walls 12, 14 of the combustor basket to the flowing air by convection. This method of cooling the combustor basket body requires a significant amount of air to be added to the combustor section and the combustor basket material may still have a limited maximum temperature allowance. Further, since it is desirable to increase combustion temperatures to increase the efficiency of the combustor, known combustors with the aforementioned plate fin design are limited in the efficiency they can obtain. Even further, the method of manufacturing such baskets having plate fins can be very costly and requires a large number of components. Thus, there is a need for a combustor basket that requires less air to be cooled, can withstand relatively high operating temperatures, and that is able to be manufactured easily.

BRIEF DESCRIPTION OF THE DRAWINGS

The invention is explained in the following description in view of the drawings that show.

The invention is explained in the following description in view of the drawings that show.

DETAILED DESCRIPTION OF THE INVENTION

In accordance with one aspect of the present invention, the inventor has surprisingly found that the material properties, i.e. coefficient of thermal expansion, thermal conductivity, etc., of a metallic alloy or superalloy material and a ceramic matrix composite (CMC) material are such that an interference fit can be provided between a liner formed from the CMC material and an inner surface of a combustor basket wall formed from the alloy material that will be maintained during combustion and steady state operation. The interference fit of the combustor basket and CMC liner further provides a combustor basket that advantageously reduces the amount of air or other medium needed to cool the combustor basket body and increases the maximum allowable flame temperature that the combustor basket can withstand. In one embodiment, the liner has a pre-installation outer diameter that is greater than the inner diameter of the cavity such that the interference fit exists between the wall of the combustor basket and the liner when the liner is installed within the cavity of the combustor basket.

In accordance with another aspect of the present invention, the inventor has developed a method of manufacturing a combustor basket that vastly improves and simplifies the manufacturing of combustor baskets. In one embodiment, the method comprises providing a combustor basket having a generally tubular wall defining a cavity; providing a liner of a ceramic matrix composite material; forming a temperature differential between the generally tubular wall and the liner effective to enable insertion of the liner within the cavity; inserting the liner within the cavity; and allowing the liner and the wall to return to ambient temperature to establish an interference fit therebetween.

Figure 1:
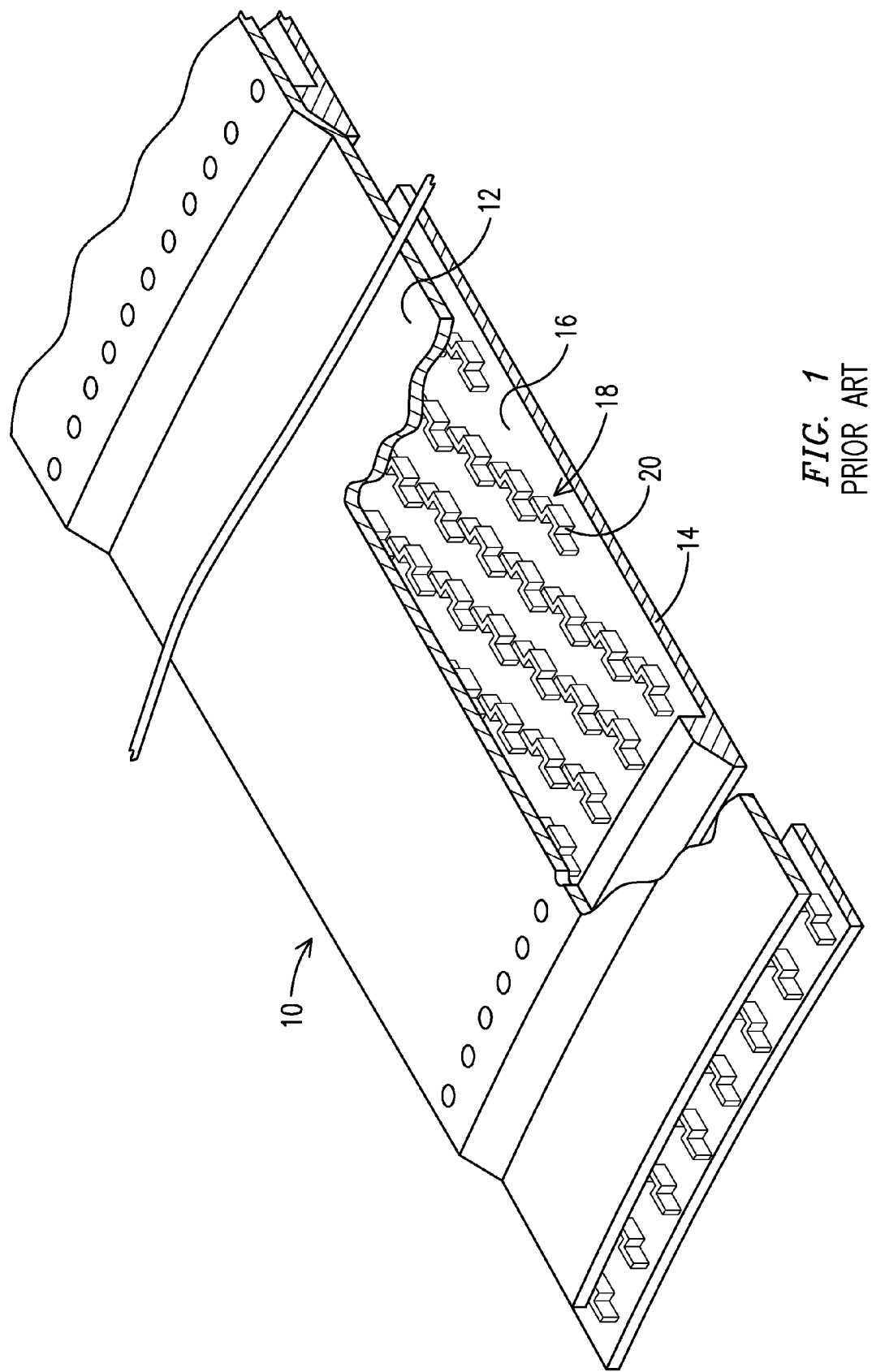
FIG. 1 depicts a prior art combustor basket having plate fins disposed with an annular gap for cooling the combustor body with an air flow through the annular gap.
Figure 2:
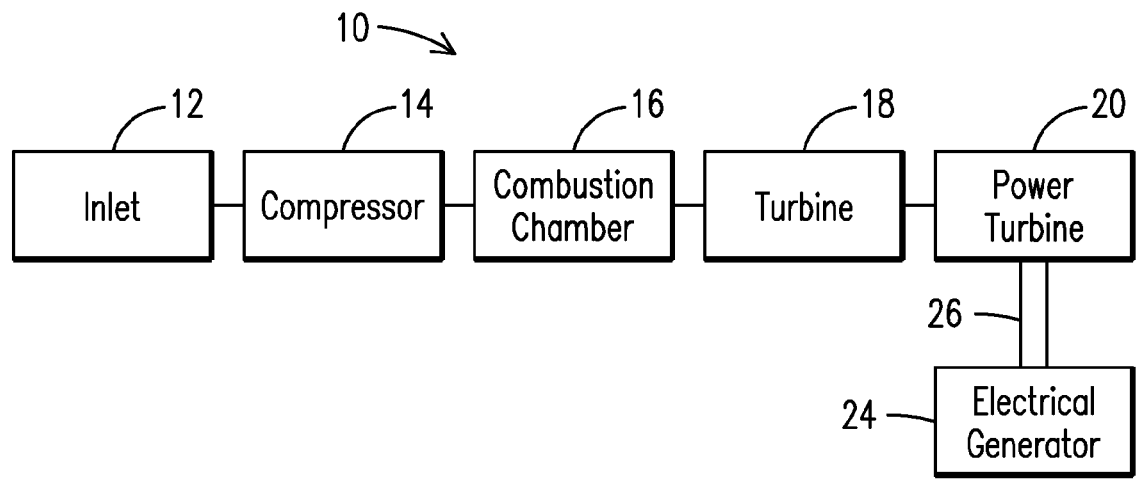
FIG. 2 is a schematic of a multi-stage axial combustor system in accordance with one aspect of the present invention.

Now referring to the drawings, FIG. 2 depicts an industrial gas turbine engine 10 comprising in axial flow series: an inlet 12, a compressor section 14, a combustor 16, a turbine section 18, a power turbine section 20 and an exhaust 22. The turbine section 20 is arranged to drive the compressor section 14 via one or more shafts (not shown). Typically, the power turbine section 20 is arranged to drive an electrical generator 24 via a shaft 26.

Figure 3:
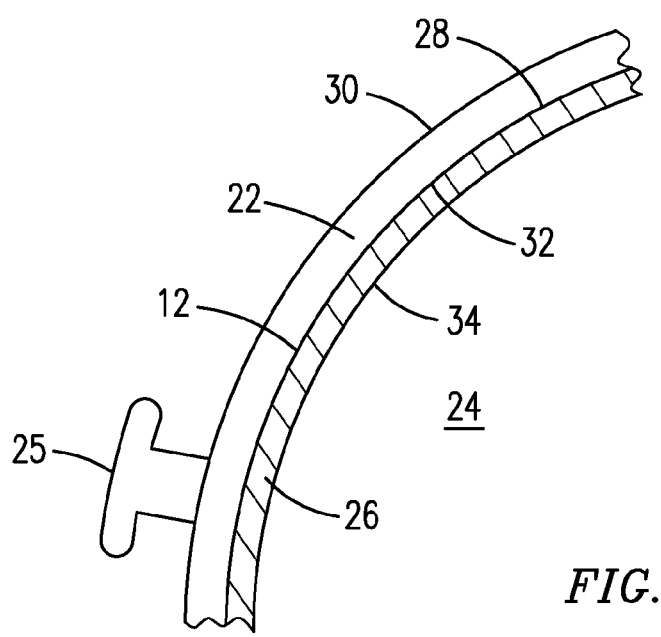
FIG. 3 is a cross-sectional view of a combustor basket in accordance with one aspect of the present invention.

FIG. 3 depicts a combustor basket 20 for use in a combustor 16 in accordance with one aspect of the present invention comprising an outer cylindrical wall 22 defining a cavity 24 and a liner 26 of a CMC material. Cylindrical wall 22 has an inner surface 28 and an outer surface 30 and liner 26 has an inner surface 32 and an outer surface 34. When the liner 26 is positioned within the cavity 24 of the combustor basket 10 as set forth below, an interference fit is provided between the wall 22 and the liner 26 such that an outer surface 34 of the liner 26 is in substantial or full contact with the inner surface 28 of the cylindrical wall 22.

The body of the combustor basket 20 may be formed from any suitable material. In one embodiment, the basket 20 is formed from a metallic alloy, a superalloy material, or combinations thereof (hereinafter collectively referred to as "alloy materials"), such as Hast-X or Hastelloy-X (and any of its compositions), IN939, X-45, and PWA 1483. The cylindrical wall 22 of the combustor liner typically has a thickness of from about 2 mm to about 3.5 mm. Because the combustor basket wall 22 is formed from an alloy material, corresponding metallic or metallic alloy attachments 25 may be welded to the basket body as is typical in the art. For example, as shown in FIG. 3, attachment 25 is welded to an outer diameter of the body of the combustor basket.

The liner 26 is typically formed on a ceramic matrix composite (CMC) material. The CMC material may be of any suitable ceramic composite material, such as any material set forth in U.S. Pat. No. 6,746,755, the entirety of which is incorporated by reference herein. Alternatively, the liner 26 may be formed from any other commercially available CMC material, such as A-N720 in its various formulations. A-N720 is an oxide-oxide ceramic matrix composite (CMC) substrate. More particularly, A-N720 material utilizes Nextel™ N720 fibers (alumina and silica in the form of mullite and alumina polycrystals) disposed in an alumina matrix. In one embodiment, the liner 26 has a thickness of from about 1 to about 10 mm, and preferably between about 3 and about 6 mm. The liner may be fabricated and smoothed, if necessary, by any suitable method known in the art. In addition, the fibers comprising the CMC material may be oriented at any suitable angle relative to adjacent fibers, such as from 45 to 90 degrees relative to one another.

In one embodiment, the combustor basket 20 may be assembled by first exposing the liner 26 to a temperature less than ambient temperature to cause thermal contraction of the material forming the liner 26. The temperature is reduced to such an extent that the liner 26 may be inserted within the interior cavity 24 of the combustor basket 20. The liner 26 is then inserted into the cavity 24 and the temperature of the liner 26 allowed to return to ambient temperature. As the temperature of the liner 26 increases toward ambient temperature, the outer diameter of the liner 26 increases, the liner 26 thermally expands, and the liner 26 forms an interference fit with the wall 22 of the combustor basket 20 without the need for any fasteners, nuts and bolts, or the like. In one embodiment, the temperature of the liner 26 is first reduced by dipping the liner 26 in liquid nitrogen before the liner 26 is inserted within the cavity 24 of the combustor basket 20.

Alternatively, in another embodiment, the temperature of the cylindrical wall 22 of the combustor basket 20 may be increased to thereby cause thermal expansion of the cylindrical wall 22 and increase the size of the inner diameter of the cavity 24 of the combustor basket 20 such that the liner 26 may be inserted into the cavity 24 and thereafter both the liner 26 and the cylindrical wall 22 are allowed to cool to form the interference fit. In any of the embodiments described herein, the liner 26 may be inserted into the cavity 24 of the combustor basket 20 using any suitable method known in the art.

The required temperature differential to form a sufficiently strong interference fit between the liner and the wall 22 of the combustor basket 20 once the components are cooled back to ambient temperature may be determined by using standard interference fit calculations for thin-walled cylinders. In one embodiment, the required temperature differential may be determined by first calculating required pressures to establish an interference fit between the CMC liner 26 and the wall 22 of combustor basket 20. Thereafter, the degree of shrinkage of each material, which accounts for the coefficient of thermal expansion for each material, and the temperature to form the desired interference fit between the liner 26 and the combustor basket 20 may be calculated as would be appreciated by one of ordinary skill in the art.

In one embodiment, when the combustor basket is formed from a Hastelloy-X material, the temperature difference required to establish an interference fit between the liner 26 and the wall 22 of the combustor basket 20 is at least about 198° C. Thus, in this embodiment, the temperature differential may be created by cooling the liner using liquid nitrogen to a temperature at least 198° C. less than a temperature of the wall of the combustor basket. In another embodiment, the temperature differential may be created by heating the wall of the combustor basket to a temperature of at least 198° C. greater than a temperature of the liner.

Typically, prior to installation, the outer diameter of the liner 26 is at least substantially the same as the diameter of the cavity 22, and in one embodiment, ranges from about 100 to about 125% of the radius of the cavity. When assembled, the cylindrical outer surface of the liner 26 is typically substantially parallel to, concentric with, and in close tolerance with the inner surface 28 of the cylindrical wall 22. When assembled, degree of interference fit between the wall 22 of the combustor basket 20 and the combustor basket material may be from 1 to 100 mil, and in one embodiment, from 10 to 50 mil. It is contemplated that the degree of interference fit may be higher or lower if another type of alloy material is used for the combustor basket.

In prior art combustor baskets, often a liner material (if any) and the basket material were formed from the same material. Typically, the inner liner was bonded or otherwise secured to the basket material. Because the inner liner and combustor basket wall included the same material and because the inner liner experienced significantly greater temperatures than the alloy material during combustion, the inner liner was in danger of expanding too greatly relative to the alloy material of the combustor basket wall if subjected to too high a temperature. In particular, too great a degree of expansion would result in the inner liner overstressing the combustor basket wall as a result of hoop and/or radial stresses becoming too large. Hoop stress is the mechanical stress applied in a direction perpendicular to the radius of an object. Radial stress is the mechanical stress applied in a direction toward or away from the central axis of an object. In the present invention, the inventor has recognized that due to the thermal properties of the CMC material and most alloy materials, an interference fit between the CMC liner and the wall of the combustion basket can be formed and hoop and radial stresses are within a range that enable the CMC liner to expand into the wall of the of the combustion basket as the combustor basket increases in temperature, yet does not result in the liner overstressing the wall of the combustor basket.

Figure 4:
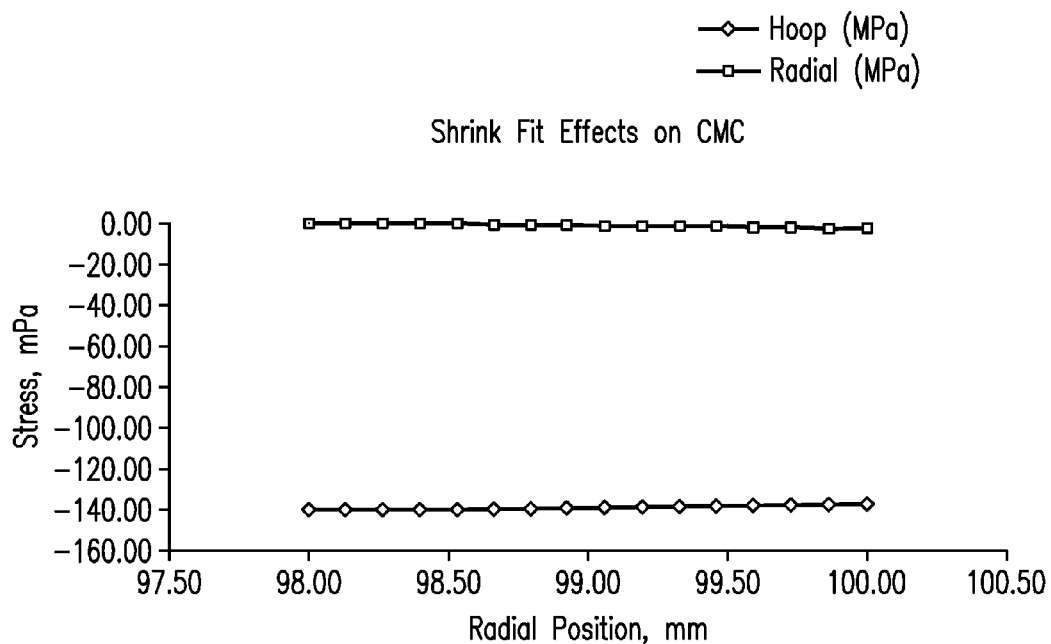
FIG. 4 is a graph showing hoop and radial stresses on the basket wall material versus a radial position on the wall at ambient conditions after assembly.
Figure 5:
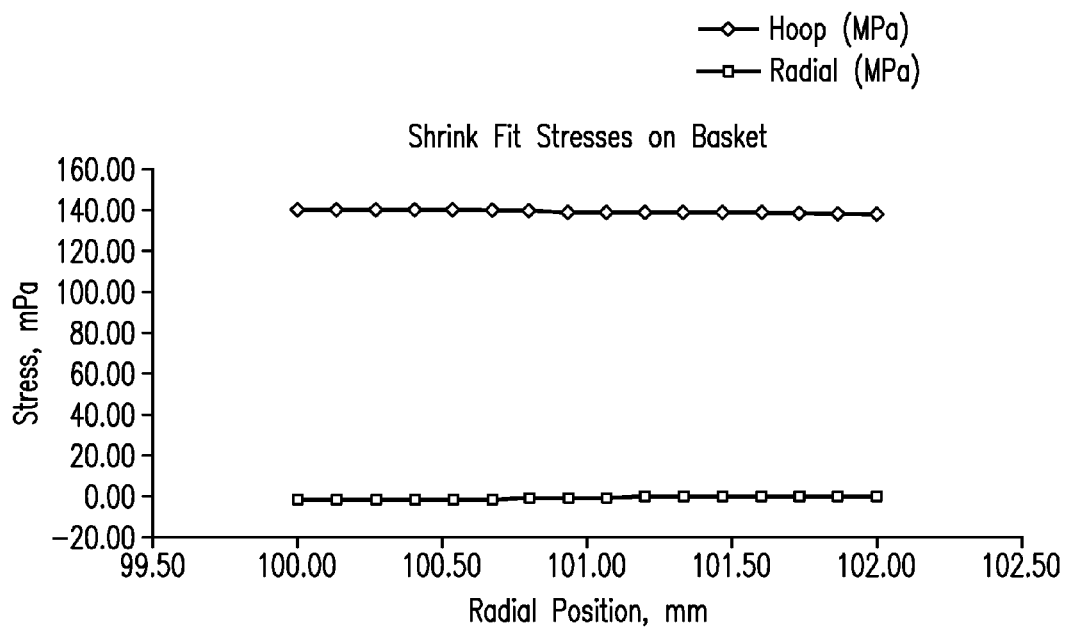
FIG. 5 is a graph showing hoop and radial stress on a CMC material versus a radial position on the basket body of the combustor basket at ambient conditions after assembly.

FIGS. 4-5 depict the hoop and radial stresses for the CMC material and the wall of the combustor basket from the inner diameter to the outer diameter of each of the CMC liner and combustor basket portions at ambient temperature and not yet or currently subjected to combustion conditions. In the embodiment depicted in FIGS. 4-5, the wall of the combustor baskets was formed from HastelloyX-Plate, a metallic superalloy material. As shown in FIG. 4, the hoop and radial stress of the CMC material were calculated at 0.13-0.14 mm increments from an inner diameter to an outer diameter position of the CMC liner. The results showed that the hoop stress increased as the radial position increased from an inner diameter to an outer diameter of the CMC liner. Similarly, FIG. 5 shows that the hoop stress decreased in value as the radial position increased from an inner diameter to an outer diameter of the combustor basket wall. In addition, FIGS. 4-5 show that the radial stresses for the CMC material decreased in value as the radial position increased from an inner diameter to an outer diameter of the CMC liner. Correspondingly, the radial stresses for the wall of the combustor basket increased in value as the radial position increased from an inner diameter to an outer diameter of the CMC liner. Thus, as shown, compressive forces are provided to maintain the interference fit between the liner and the wall of the combustor basket. To determine the relationship between magnitudes of tangential and radial stresses, basic press and shrink-fit equations known in the art may be utilized, such as those provided in Mechanical Engineering Design, Shigley, J. E., $2^{nd}$ edition McGraw Hill, section 2-14, pp. 76-80, for example.

Figure 6:
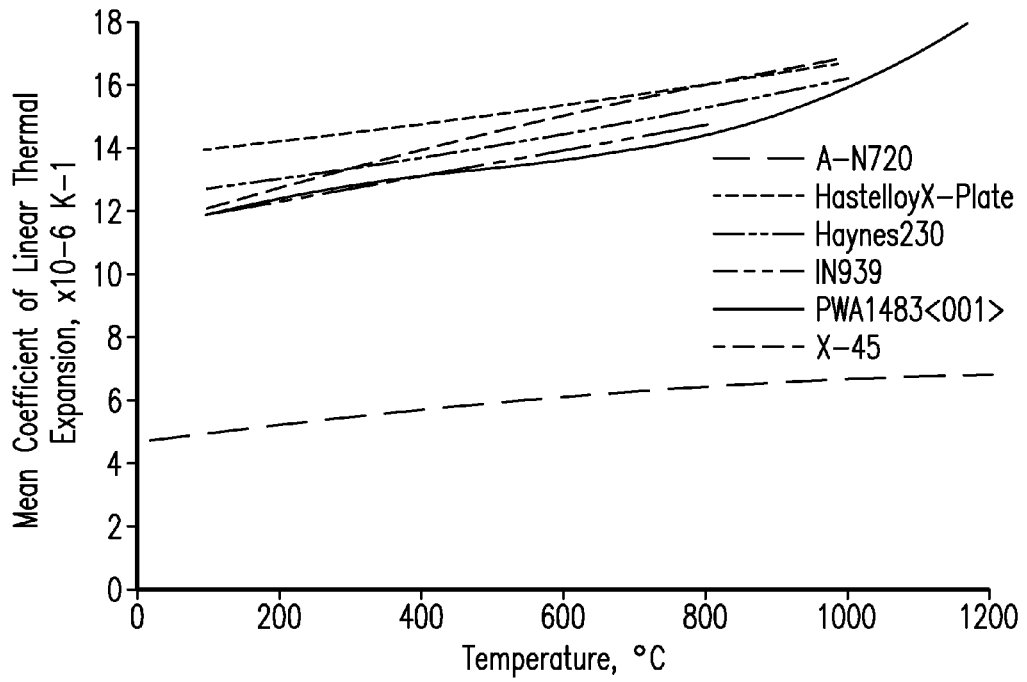
FIG. 6 is a graph showing the mean coefficient of linear thermal expansion of a CMC material and various metallic alloy materials versus temperature.

The stresses experienced by the wall of the combustor basket and the liner are also related to the degree of expansion of the CMC liner relative to the degree of expansion of the material forming the combustor basket wall. As shown in FIG. 6, the coefficient of thermal expansion for various alloy materials (HastelloyX-Plate, Haynes230, IN939, PWA1483, and X-45), which may be used to from the combustor basket body, is markedly greater than the coefficient of thermal expansion for the CMC material (A-N720), which may be used to form the liner. As a result, when subjected to extreme temperatures, i.e. even up to and including 1600° C., the CMC liner material, may expand, but will not expand to a greater degree than the alloy materials of the combustor basket (assuming both are of the same temperature). Put another way, the alloy materials will generally expand at a greater rate per degree than the CMC material. Accordingly, the degree of thermal expansion of the CMC material is such that the CMC material of the liner will not expand so as to overstress the material of the basket wall.

On the other hand, the inventor has found that at the temperatures to be experienced by the combustor basket wall and the liner during combustion, the CMC liner will expand to a degree (relative to the degree of expansion of the material that comprises the basket wall) sufficient such that the liner is in no danger of losing contact with the basket wall. In this way, the interference fit between the liner and the combustor basket wall will be maintained when the combustor basket is subjected to the high temperatures of combustion and during steady state operation. In one embodiment, the combustor basket comprises a basket material selected from the group consisting of a metallic alloy material, a superalloy material, and combinations thereof ("alloy materials") and a coefficient of thermal expansion for the basket material is from about 1.5 to about 10 times a value for a coefficient of thermal expansion for the CMC material of the liner.

Figure 7:
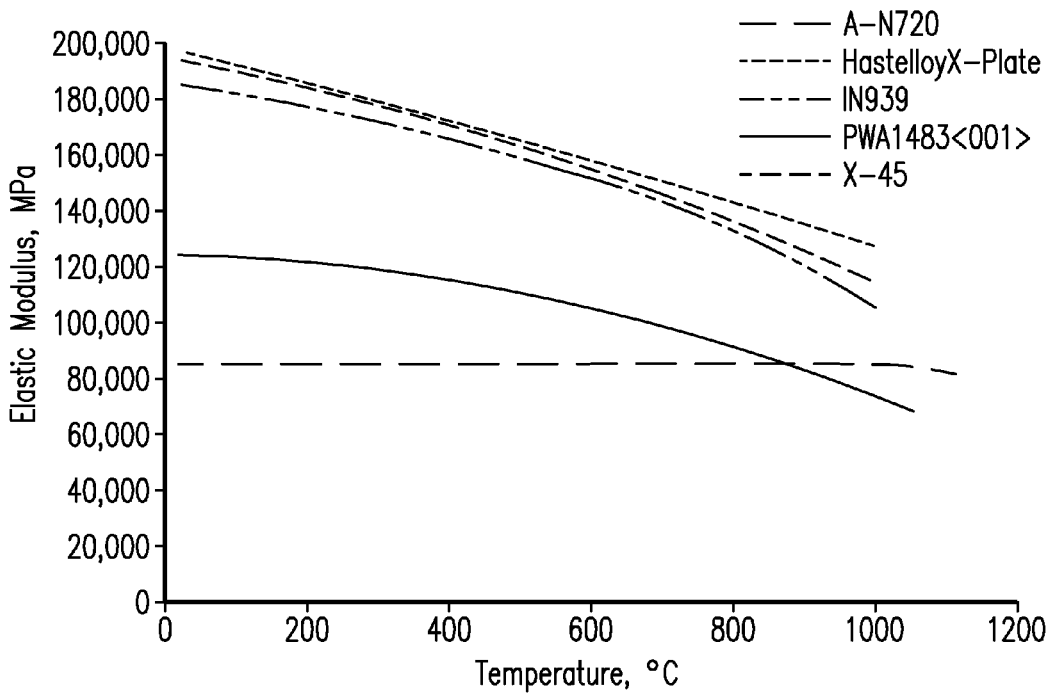
FIG. 7 is a graph showing the elastic modulus of a CMC material and various metallic alloy materials versus temperature.

As shown in FIG. 7, one embodiment of a CMC material, A-N720, also has a comparable elastic modulus to various materials that may comprise the wall of the combustor basket. Specifically, as shown, the CMC material (A-N720) had an elastic modulus comparable to HastelloyX-Plate and IN939 materials (metallic alloy materials) and had a greater elastic modulus value (measured up to 1000° C.) than two other metallic alloy materials (PWA 1483 and X-45). An elastic modulus is the mathematical description of a substance's tendency to be deformed elastically when a force is applied to it or put another way, the stress required to cause a material to double in length. Thus, when interfacing with the heat from the gases traveling down the combustor chamber of the combustor basket, the CMC material is able to stretch at least to a comparable degree as the material that comprises the wall of the combustor basket. In this way, the CMC liner is not likely to sheer, crack, or break in response to the high temperatures of combustion.

A combustor basket having a CMC liner shrunk fit to a combustor basket body in accordance with the present invention provides numerous additional advantages over known combustor baskets. For example, some known combustor baskets utilize thermal barrier coatings (TBC coatings) to line the combustor basket. TBC coatings, however, have the disadvantage of not having much, if any, strength (yield or impact strength). As a result, any matter that is inadvertently introduced into the combustor basket may be projected or slung into the TBC coating. Because of the lack of any substantial strength, the TBC coating will readily chip off and the combustor basket will require recoating of the TBC material, resulting in significant downtime, labor, and expense. The CMC-lined combustor basket of the present invention, conversely, eliminates the significant problem of recoating the liner material since the CMC liner has a relatively high yield and impact strength and is resistant to cracking or chipping.

Figure 8:
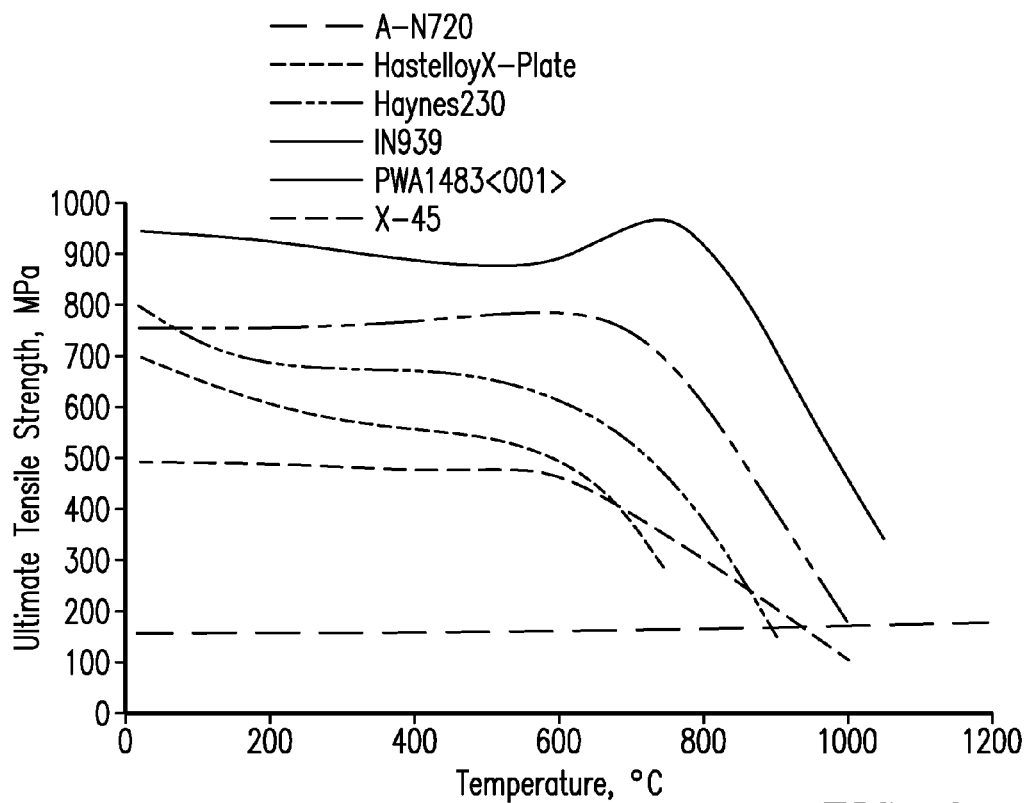
FIG. 8 is a graph showing the tensile strength of a ceramic matrix composite (CMC) material and various metallic alloy materials versus temperature.

In FIG. 8, the ultimate tensile strength of a CMC material (A-N720) is compared to the ultimate tensile strength of a number of metallic alloy materials (HastelloyX-Plate, Haynes 230, IN939, PWA 1483, and X-45) that may be used to fabricate the wall of the combustor basket. The CMC material has a notably greater tensile strength than the metallic alloy materials. Thus, the interference fit of the CMC liner to a basket wall provides a combustor basket with a high ultimate tensile strength material that is the interface between the gases traveling down the combustion chamber of the combustor basket. The CMC liner will not easily shear or tear, even at high temperatures, i.e. 1600° C.

Figure 9:
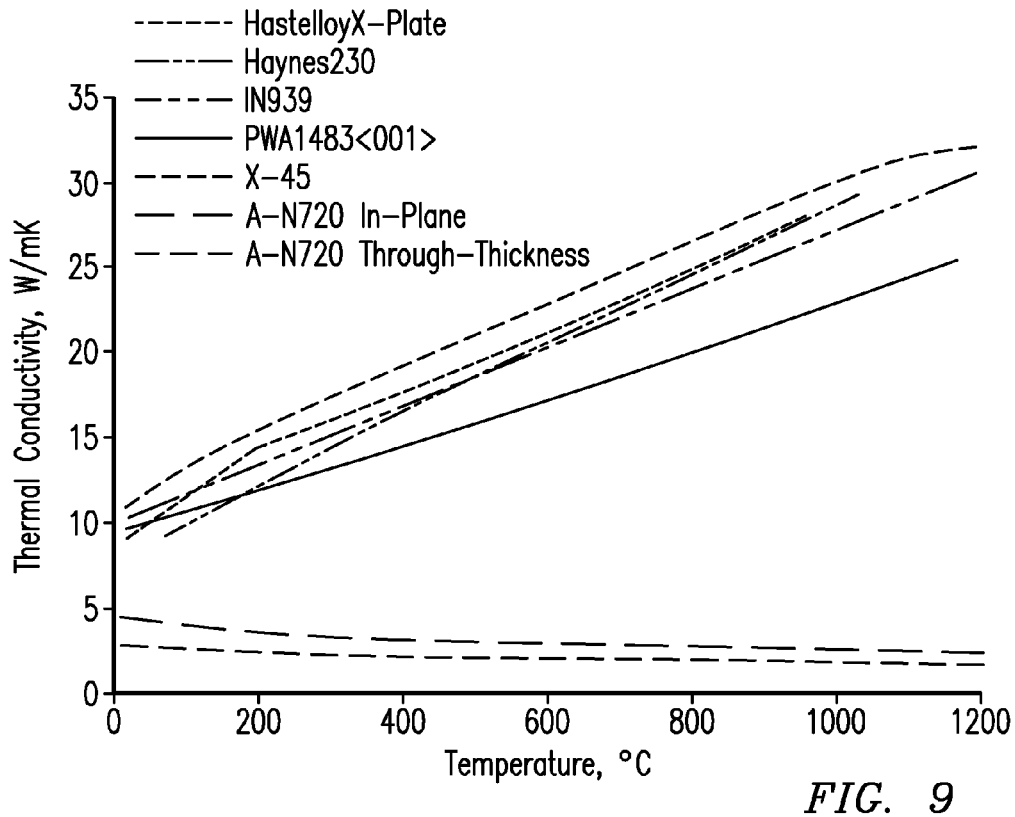
FIG. 9 is a graph showing the thermal conductivity of a CMC material and various metallic alloy materials versus temperature.

Further, since the CMC liner can hold heat well, the combustor basket can further withstand relatively high combustion temperatures as compared to prior art combustor baskets. As shown in FIG. 9, several metallic alloy materials (Hastelloy-X-Plate, Haynes320, IN939, PWA1483, and X-45), which may comprise the wall of the combustor basket, have a thermal conductivity value, measured in W/mK, which is greater than the thermal conductivity values for particular CMC materials (A-N720 in-plane and A-N720 through thickness). In one embodiment, the combustor basket comprises a material selected from the group consisting of a metallic alloy material, a superalloy material, and combinations thereof ("alloy materials"), and a thermal conductivity value for the alloy materials is at least about 5 times greater than a thermal conductivity value for the CMC material of the liner, and preferably 5-15 times greater. Since the CMC liner does not rapidly conduct and transmit heat from the hot temperatures contacting the surface of the CMC liner to the material of the combustor basket body, the CMC lined combustor baskets of the present invention can withstand very high combustion temperatures. In one embodiment, the combustor basket having an interference fit can withstand temperatures during combustion of 1600° C. or greater.

Further, due to the elimination of plate fins and the ability of the combustor baskets of the present invention to withstand extremely high temperatures without failure, the need for cooling air is significantly reduced. The inventor has found that relative to combustor baskets that utilize plate fins for cooling the combustor body, the amount of air required for cooling the combustor basket body can be reduced by at least about 30%, and in some embodiments by at least about 50%. This can result in a significant amount of cost savings as often combustion engines may include 16 baskets. Although not necessary, to provide for cooling of the combustor basket body, either the liner or the wall of the combustor basket, or both, may include a plurality of apertures or grooves for allowing air to flow therethrough for facilitating cooling of the components.

In another embodiment, although also not required, a plurality of pins may be inserted through an outer surface around a circumference of the combustor basket to maintain the liner in a fixed position relative to the inner surface of the combustor basket.

In addition, the prior art embodiments of combustor baskets utilizing plate fins for cooling the basket body require a significant amount of material, precision, time, labor, and expense to manufacture, including but not limited to, the welding of the plate fins to the combustor basket body. The significant reduction in components and much simpler construction of an interference fit between a CMC liner and the combustor body result in a substantially less expensive and simpler method of manufacturing of combustor baskets.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. A combustor basket of a combustor section, comprising:
   the combustor basket comprising a generally tubular wall comprising a metallic alloy material defining a cavity with an inlet and an outlet for passing an air-fuel mixture;
   a liner of a ceramic matrix composite material disposed within the cavity, wherein an interference fit exists between an outer surface of the liner located in the cavity and an inner surface of the generally tubular wall.

2. The combustor basket of claim 1, wherein a degree of interference fit between the generally tubular wall and the liner is from 10 to 45 mils.

3. The combustor basket of claim 1, wherein a thermal conductivity value for the metallic alloy material of the generally tubular wall is at least 5 times greater than a thermal conductivity value for the ceramic matrix composite material of the liner.

4. The combustor basket of claim 1, wherein a coefficient of thermal expansion for the metallic alloy material of the generally tubular wall is at least 1.5 times a value for a coefficient of thermal expansion for the ceramic matrix composite material of the liner.

5. The combustor basket of claim 1, wherein the interference fit is effective for use at a temperature of 1600° C.

6. The combustor basket of claim 1, wherein the combustor basket is used within a gas turbine engine combustor.

7. The combustor basket of claim 1, wherein a thickness of the tubular wall is between 2 mm and 3.5 mm, and wherein a thickness of the liner is between 3 mm and 6 mm.

8. The combustor basket of claim 1, wherein the liner is configured to thermally contract upon exposure of the ceramic matrix composite material of the liner to a temperature less than an ambient temperature, for insertion of the liner within the cavity;
   and wherein the liner is configured to thermally expand upon exposure of the ceramic matrix composite material of the liner to the ambient temperature, to form the interference fit between the liner and the tubular wall.

9. The combustor basket of claim 3, wherein said thermal conductivity values of the metallic alloy material of the generally tubular wall and the ceramic matrix composite material of the liner are adjusted, such that the liner is configured to expand at a degree relative to a degree of expansion of the tubular wall, to maintain the interference fit.

10. A combustor basket of a combustor section, comprising:
    the combustor basket comprising a generally tubular wall comprising a metallic alloy material defining a cavity with an inlet and an outlet for passing an air-fuel mixture;
    a liner of a ceramic matrix composite material disposed within the cavity, wherein an interference fit exists between an outer surface of the liner located in the cavity and an inner surface of the generally tubular wall, where the outer surface of the liner is in full contact with the inner surface of the generally tubular wall; and
    an alloy attachment welded to an outer surface of the generally tubular wall;
    wherein the liner has a pre-installation outer diameter that is greater than an inner diameter of the combustor basket; and
    wherein the interference fit is effective for use at a temperature of 1600° C.

11. The combustor basket of claim 10, wherein the interference fit is accommodated by a temperature differential between the outer surface of the liner and the inner surface of the generally tubular wall.

12. The combustor basket of claim 11, wherein the outer surface of the liner is configured to thermally contract upon exposure to an ambient temperature, to establish the temperature differential.

13. The combustor basket of claim 11, wherein the inner surface of the generally tubular wall is configured to thermally expand upon exposure to heat to establish the temperature differential.

14. The combustor basket of claim 11, wherein the temperature differential is approximately 198 degrees Celsius.

15. A combustor basket of a combustor section, comprising:
    the combustor basket comprising a generally tubular wall comprising a metallic alloy material defining a cavity with an inlet and an outlet for passing an air-fuel mixture;
    a liner of a ceramic matrix composite material disposed within the cavity, wherein an interference fit exists between an outer surface of the liner located in the cavity and an inner surface of the generally tubular wall;
    wherein the liner has a pre-installation outer diameter that is greater than an inner diameter of the combustor basket;
    wherein the interference fit is effective for use at a temperature of 1600° C.;
    wherein the liner is configured to thermally contract upon exposure of the ceramic matrix composite material of the liner to a temperature less than an ambient temperature, for insertion of the liner within the cavity;

and wherein the liner is configured to thermally expand upon exposure of the ceramic matrix composite material of the liner to the ambient temperature, to form the interference fit between the liner and the tubular wall.

* * * * *